(12) United States Patent
Guthery

(10) Patent No.: US 10,311,874 B2
(45) Date of Patent: Jun. 4, 2019

(54) METHODS AND SYSTEMS FOR VOICE-BASED PROGRAMMING OF A VOICE-CONTROLLED DEVICE

(71) Applicant: 4Q Catalyst, LLC, Chestnut Hill, MA (US)

(72) Inventor: Scott B. Guthery, Chestnut Hill, MA (US)

(73) Assignee: 4Q Catalyst, LLC, Chestnut Hill, MA (US)

( * ) Notice: Subject to any disclaimer, the term of this patent is extended or adjusted under 35 U.S.C. 154(b) by 0 days.

(21) Appl. No.: 16/053,264

(22) Filed: Aug. 2, 2018

(65) Prior Publication Data

US 2019/0074003 A1 Mar. 7, 2019

Related U.S. Application Data

(60) Provisional application No. 62/553,319, filed on Sep. 1, 2017.

(51) Int. Cl.
 *G10L 15/00* (2013.01)
 *G10L 15/22* (2006.01)
 (Continued)

(52) U.S. Cl.
 CPC ............. *G10L 15/22* (2013.01); *G10L 15/02* (2013.01); *G10L 15/285* (2013.01); *G10L 2015/223* (2013.01); *G10L 2015/225* (2013.01)

(58) Field of Classification Search
 CPC ................................. G10L 15/22; G06F 3/167
 (Continued)

(56) References Cited

U.S. PATENT DOCUMENTS

| 4,081,607 A | 3/1978 | Vitols |
| 4,489,435 A | 12/1984 | Moshier |

(Continued)

FOREIGN PATENT DOCUMENTS

| CN | 1248193 C | 1/2005 |
| CN | 100573663 C | 9/2006 |

(Continued)

OTHER PUBLICATIONS

Chapa, "Matched wavelet construction and its application to target detection," PhD Dissertation, Rochester Institute of Technology, 1995.

(Continued)

*Primary Examiner* — Daniel Abebe
(74) *Attorney, Agent, or Firm* — Blueshift IP, LLC; Cynthia M. Gilbert

(57) ABSTRACT

A method for voice-based programming of a voice-controlled device includes executing, by a voice-controlled device, an application for recognizing spoken programming commands, the application including a plurality of keyword phrases each associated with an action. The method includes receiving, by a voice-controlled device, an audio signal representing a user utterance. The method includes identifying, by the voice-controlled device, within the received audio signal, one of the plurality of keyword phrases and data for use in taking the action associated with the one of the plurality of keyword phrases. The method includes modifying, by the voice-controlled device, at least one data structure stored by the voice-controlled device responsive to the identified one of the plurality of keyword phrases and data.

4 Claims, 12 Drawing Sheets

(51) Int. Cl.
G10L 15/02 (2006.01)
G10L 15/28 (2013.01)

(58) Field of Classification Search
USPC ........................................................ 704/275
See application file for complete search history.

(56) References Cited

U.S. PATENT DOCUMENTS

| | | | |
|---|---|---|---|
| 4,783,804 A | 11/1988 | Juang | |
| 4,823,253 A | 4/1989 | Shima | |
| 5,073,939 A | 12/1991 | Vensko | |
| 5,509,104 A | 4/1996 | Lee | |
| 5,615,296 A | 3/1997 | Stanford | |
| 6,064,963 A | 5/2000 | Gainsboro | |
| 6,173,266 B1 | 1/2001 | Marx et al. | |
| 6,226,612 B1 | 5/2001 | Srenger | |
| 6,526,382 B1 | 2/2003 | Yuschik | |
| 6,598,022 B2 | 7/2003 | Yuschik | |
| 6,615,170 B1 | 9/2003 | Liu | |
| 6,839,670 B1 | 1/2005 | Stammler | |
| 7,089,575 B2 | 8/2006 | Agnihotri | |
| 7,127,403 B1 | 10/2006 | Saylor | |
| 7,191,133 B1 | 3/2007 | Pettay | |
| 7,529,675 B2 | 5/2009 | Maes | |
| 7,716,056 B2 | 5/2010 | Weng | |
| 7,873,523 B2 | 1/2011 | Potter | |
| 8,612,233 B2 | 12/2013 | Anand | |
| 9,373,330 B2 | 6/2016 | Cumani | |
| 9,471,872 B2 | 10/2016 | Anand | |
| 9,508,340 B2 | 11/2016 | Parada San Martin | |
| 9,600,231 B1 | 3/2017 | Sun | |
| 9,754,584 B2 | 9/2017 | Parada San Martin | |
| 10,054,327 B2* | 8/2018 | Nelson | F24F 11/30 |
| 2002/0042713 A1 | 4/2002 | Kim | |
| 2002/0107695 A1 | 8/2002 | Roth | |
| 2005/0091057 A1 | 4/2005 | Phillips | |
| 2005/0129188 A1 | 6/2005 | Lee | |
| 2005/0246169 A1 | 11/2005 | Lahti | |
| 2006/0069560 A1 | 3/2006 | Passaretti | |
| 2007/0124149 A1* | 5/2007 | Shen | G10L 15/26 704/275 |
| 2007/0271241 A1 | 11/2007 | Morris | |
| 2008/0221876 A1 | 9/2008 | Holdrich | |
| 2009/0222258 A1 | 9/2009 | Fukuda | |
| 2009/0306981 A1 | 12/2009 | Cromack | |
| 2010/0004931 A1 | 1/2010 | Ma | |
| 2010/0057453 A1 | 3/2010 | Valsan | |
| 2010/0114575 A1 | 5/2010 | Itoh | |
| 2010/0179811 A1 | 7/2010 | Gupta | |
| 2011/0054892 A1 | 3/2011 | Jung | |
| 2012/0022863 A1 | 1/2012 | Cho | |
| 2013/0117027 A1 | 5/2013 | Choi | |
| 2013/0166279 A1 | 6/2013 | Dines | |
| 2013/0197914 A1* | 8/2013 | Yelvington | G06F 3/167 704/275 |
| 2013/0238312 A1 | 9/2013 | Waibel | |
| 2013/0246064 A1 | 9/2013 | Wasserblat | |
| 2013/0289987 A1 | 10/2013 | Ganapathiraju | |
| 2013/0317823 A1* | 11/2013 | Mengibar | G06Q 30/0277 704/251 |
| 2013/0339028 A1 | 12/2013 | Rosner | |
| 2014/0237277 A1 | 8/2014 | Mallinson | |
| 2015/0039299 A1 | 2/2015 | Weinstein | |
| 2015/0039301 A1 | 2/2015 | Senior | |
| 2015/0053781 A1 | 2/2015 | Nelson | |
| 2015/0154002 A1 | 6/2015 | Weinstein | |
| 2015/0195406 A1 | 7/2015 | Dwyer | |
| 2016/0063996 A1 | 3/2016 | Chen | |
| 2016/0275968 A1 | 9/2016 | Terao | |
| 2016/0307571 A1 | 10/2016 | Mizumoto | |
| 2017/0103748 A1 | 4/2017 | Weissberg | |
| 2017/0125008 A1 | 5/2017 | Maisonnier | |
| 2017/0148444 A1 | 5/2017 | Bocklet | |
| 2017/0186427 A1* | 6/2017 | Wang | G06F 3/167 |
| 2017/0206895 A1 | 7/2017 | Tang | |
| 2017/0236512 A1 | 8/2017 | Williams | |

FOREIGN PATENT DOCUMENTS

| | | |
|---|---|---|
| CN | 101004737 A | 7/2007 |
| CN | 101154379 A | 4/2008 |
| CN | 101308653 A | 11/2008 |
| CN | 101309327 B | 11/2008 |
| CN | 101571921 B | 11/2009 |
| CN | 101593519 B | 12/2009 |
| CN | 101650945 B | 2/2010 |
| CN | 102194454 B | 9/2011 |
| CN | 102693723 A | 9/2012 |
| CN | 102915729 B | 2/2013 |
| CN | 103559881 B | 2/2014 |
| CN | 103886871 B | 6/2014 |
| CN | 103985390 A | 8/2014 |
| CN | 104143326 B | 11/2014 |
| CN | 104157284 A | 11/2014 |
| CN | 104464723 B | 3/2015 |
| CN | 105118502 B | 12/2015 |
| CN | 105190746 A | 12/2015 |
| CN | 105206271 A | 12/2015 |
| CN | 105355199 A | 2/2016 |
| CN | 106297776 A | 1/2017 |
| CN | 107112012 A | 8/2017 |
| DE | 19938649 T2 | 4/2007 |
| DE | 60305568 T2 | 4/2007 |
| EP | 1012828 B1 | 8/2001 |
| EP | 0834861 B1 | 11/2001 |
| EP | 1076896 B1 | 10/2002 |
| EP | 1361737 A1 | 11/2003 |
| EP | 1361738 A1 | 11/2003 |
| EP | 1361739 A1 | 11/2003 |
| EP | 1361740 A1 | 11/2003 |
| EP | 1355295 B1 | 5/2011 |
| EP | 2608196 B1 | 7/2014 |
| JP | 0634193 B2 | 5/1994 |
| JP | H06266386 A | 9/1994 |
| JP | H08314490 A | 11/1996 |
| JP | 2005148764 A | 6/2005 |
| JP | 3968133 B2 | 8/2007 |
| JP | 2008064892 A | 3/2008 |
| JP | 2008216618 A | 9/2008 |
| JP | 5385876 B2 | 3/2012 |
| JP | 5142720 B2 | 2/2013 |
| JP | 2013029868 A | 2/2013 |
| JP | 5988077 B2 | 9/2013 |
| JP | 2013182150 B2 | 9/2013 |
| JP | 5647455 B2 | 12/2014 |
| JP | 2015022112 A | 2/2015 |
| JP | 2015068897 A | 4/2015 |
| JP | 2015219480 A | 12/2015 |
| JP | 2016080767 A | 5/2016 |
| JP | 2016143125 A1 | 6/2017 |
| KR | 100597434 B1 | 7/2006 |
| KR | 20090123396 A | 12/2009 |
| KR | 101065188 B1 | 2/2011 |
| KR | 101037801 B1 | 5/2011 |
| KR | 101737083 B1 | 2/2012 |
| KR | 20120111510 A | 10/2012 |
| KR | 20150087253 A | 7/2015 |
| KR | 101713784 B1 | 3/2017 |
| WO | 2000005709 A1 | 2/2000 |
| WO | 2003088080 A1 | 10/2003 |
| WO | 2012097150 A1 | 7/2012 |

OTHER PUBLICATIONS

Chen et al., "Small-Footprint Keyword Spotting using Deep Neural Networks", IEEE International Conference on Acoustics, Speech and Signal Processing (ICASSP), May 4-9, 2014.

Doetsch, "Optimization of Hidden Markov Models and Neural Nets," Diploma Thesis, Rheinisch-Westfaelische Technische Hochschule Aachen, Dec. 1, 2011.

(56) References Cited

OTHER PUBLICATIONS

El Meliani, R., et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Evans, James R., et al. "Achieving a hand-free computer interface using voice recognition and speech synthesis," Proc. IEEE Systems Readiness Technology Conference AUTOTESTCON '99, Aug. 30, 1999-Sep. 2, 1999, pp. 105-107.

Parada et al., "Query-by-Example Spoken Term Detection for OOV Terms," IEEE Workshop on Automatic Speech Recognition & Understanding, 2009, ASRU 2009, Nov.-Dec. 2009, pp. 404-409.

Rohlicek, et al., "Continuous Hidden Markov Modeling for Speaker-Independent Word Spotting," Proceedings of the 1989 ICASSP Conference, pp. 627-630.

Turunen "Adaptive Interaction Methods in Speech User Interfaces", Conference on Human Factors in Computing Systems, Seattle, Washington, 2001, pp. 91-92.

Wei, "Iterative Viterbi algorithm: implementation issues," IEEE Transactions on Wireless Communications, v.3 No. 2, pp. 382-386, 2004.

Wilpon et al., "Automatic Recognition of Keywords in UnconstrainedSpeech Using Hidden Markov Models", 1990 IEEE Trans. ASSP v. 138, No. 11, pp. 1870-1878.

Zue et al., "Conversational Interfaces: Advances and Challenges," Proceedings of the IEEE, v.88, No. 8, 1168-1180, Aug. 2000.

Huang et al., "Iterative Viterbi A* Algorithm for K-Best Sequential Decoding," Proceedings of the 50th Annual Meeting of the Association for Computational Linguistics, Jeju, Republic of Korea, Jul. 8-14, 2012, pp. 611-619.

Silaghi et al., "Posterior-Based Keyword Spotting Approaches without Filler Models—Iterative Viterbi Decoding and One-Pass Approaches," Technical Report TR-99/322, Nov. 1999, 17 pages.

\* cited by examiner

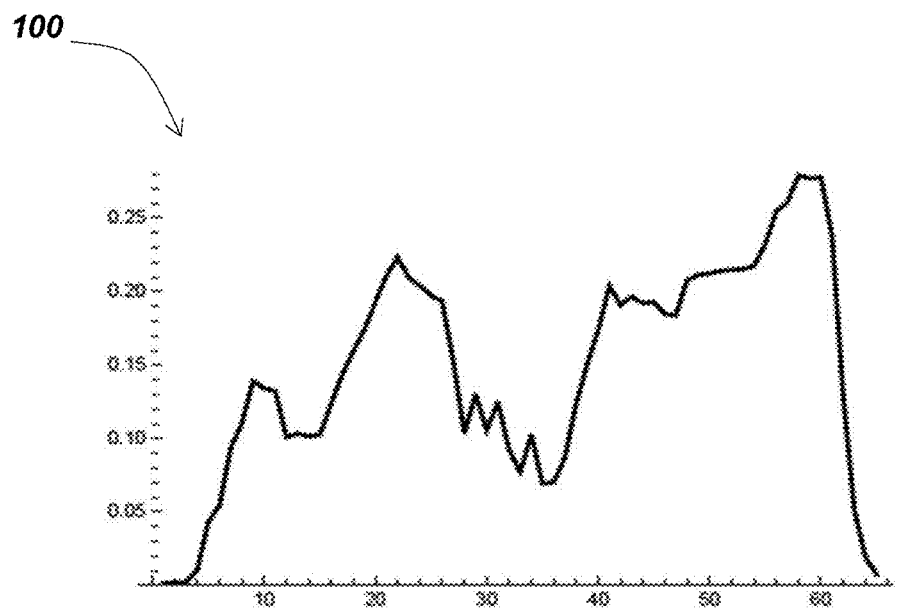
FIG. 4C: "When You Hear"
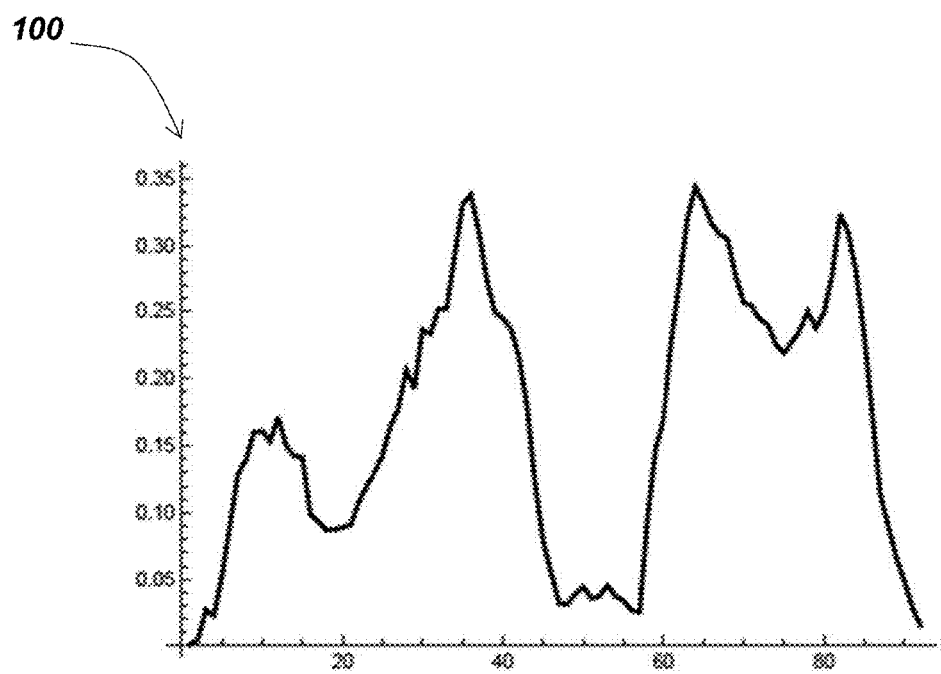
FIG. 4D: "Then You Say"

*100*

| Command Segment | Name Value Segment | Command Segment | Name-Value Segment |
|---|---|---|---|
| When You Hear | Pointer to Extracted portion of Audio signal between "when you hear" and "then you say" | Then You Say | Pointer to Extracted portion of Audio signal following "then you say" |
| Create a Table | | | |
| Name Table | Birthday | | |
| Put | Uncle Fred | In | The First Column of the Birthday Table |
| Put | March Fifteenth | In | The Second Column of Uncle Fred's Entry in Birthday Table |

*Fig. 4H*

| Keyword Phrase | Action | Keyword Phrase | Action |
|---|---|---|---|
| When You Hear | Activate microphones and begin monitoring | Then You Say | If in Programming Mode, Store Name Value Segment in Database 108; If in Operation Mode, Retrieve Name Value Segment, Direct Playback |
| Create a Table | New data structure of type table | | |
| Name Table | Set name of most recently created table to name-value segment | | |
| Put | Extract name-value segment from between "put" and "in" | In | Store extracted name-value segment at location identified in name-value segment following "in" |

*Fig. 4I*

METHODS AND SYSTEMS FOR VOICE-BASED PROGRAMMING OF A VOICE-CONTROLLED DEVICE

CROSS-REFERENCE TO RELATED APPLICATIONS

This application claims priority from U.S. Provisional Patent Application No. 62/553,319, filed on Sep. 1, 2017, entitled "Conversational Programming of Voice-Activated and Voice-Response Devices," which is hereby incorporated by reference.

BACKGROUND

The disclosure relates to voice-controlled devices. More particularly, the methods and systems described herein relate to functionality for voice-based programming of a voice-controlled device.

There has been an increase in the adoption and function set of voice-activated devices in consumer and commercial markets. Devices such as AMAZON ECHO and GOOGLE HOME currently support network-connected applications and interfaces that can be used to control home lighting, entertainment systems, and specially-programmed appliances. Other devices allow for simple question and answer style conversations between the user and the device, with the device programmed to provide voice responses to user utterances; conventional applications of such devices are the playing of media, searching for data, or simple conversation (e.g., the device allows the user to ask the device to tell a joke or provide a weather forecast, and the device complies).

However, such voice-activated device applications can be personalized only to a limited extent by the end user, based on a fixed and pre-defined set of vendor-supported features. Adding new applications or modifying the functionality of existing applications can typically only be accomplished in conventional systems through use of the vendor-supported, text-based programming languages. Although many conventional systems provide functionality for improving a level of accuracy in interpreting audio input (e.g., via expanded or customized vocabulary sets), conventional systems do not typically provide for creation of new programs for execution by the voice-activated and voice-response devices, much less via a verbal dialog with the device, in spite of the device's conventional capability to receive and respond to verbal commands. As a result, end-users and organizational adopters of conventional voice-activated devices who are not skilled in conventional programming languages face significant barriers in extending and adding functionality to the devices.

Furthermore, conventional voice-activated and voice-response devices typically require a network connection in order to perform natural language processing of user utterances. For example, some such devices constantly monitor all human utterances uttered within range of a microphone in the device and upon determining that a particular utterance includes a particular word or phrase, the device begins transmission of subsequent utterances over a network to a remotely located machine providing natural language processing services. Such devices typically rely upon or require word-level, speech-to-text translations of audio input and require a level of speed, accuracy, and processing power in excess of the limited natural language processing available in the voice-activated and voice-response devices; therefore, this use of network connectivity provides improved natural language processing and improves the utility of the device. However, leveraging remote processing over a network raises additional concerns, such as transmission reliability and the utility of the device without a networking connection as well as privacy and security concerns regarding the transmission of non-public, conversational utterances to a remote computing service.

In some vendor-supplied application development environments, the application programmer must create and maintain multiple parts of an application, which may in turn have to be written in different programming languages; furthermore, a different development environment may have to be used to create and maintain each part. Using different programming languages and different development environments is not only inefficient but creates the problem of keeping all the parts in synchronization. Thus, using these vendor-supplied application development environments may require knowledge and expertise not typically possessed by end users who are not skilled in computer programming. Furthermore, the application programmer is required to acquire and become skilled in the use of a network-connected computer in order to communicate with the vendor's backend program development services. As a result of these and other such barriers, non-technical users of voice-controlled devices are effectively prohibited from adapting and extending the functionality of these devices.

Although techniques are known that minimize or eliminate the need to perform word-level natural language processing of audio signals, such techniques are not conventionally used to allow speakers to create new programs executable by voice-controlled devices, modify existing programs executable by voice-controlled devices, modify the data structures stored by voice-controlled devices, or otherwise interact with the voice-controlled device using audio input to generate and execute computer programs.

Historically, voice-controlled devices formed or were part of systems such as interactive phone systems in which a non-programmer user neither owns the device nor wishes to speak with the device, much less possesses the skills or permissions necessary to modify or extend the capabilities of the systems. For instance, a typical user trying to reach a customer service representative by calling into an interactive phone system does not wish to ask the phone system what the weather is or if it can play a certain song or share a knock-knock joke; the typical user of such a device wishes to keep the interaction with the device as short as possible and limited to a specific, structured, and pre-defined interaction. This is in stark contrast to a home robot, industrial control panel, self-driving vehicle, or other voice-controlled and voice-response device, where the typical user engages in a more free-form, conversational interaction with the device. In these cases, it is natural and compelling for the user to wish to personalize and adapt the device to their own needs, desires, and modes of utilization. However, manufacturers of such newer devices have not typically provided the capability to modify or extend the built-in conversational scenarios for the user who may wish to engage in more than canned dialog and does not wish to keep the conversation artificially short, but wishes to develop their own functionality and programs to extend the utility of conversing with the device, including through the development of wholly new applications.

Thus, there is a need for improved functionality and ease of use for programming voice-controlled, voice-response devices by users via spoken dialog with the devices being programmed.

BRIEF SUMMARY

In one aspect, a method for voice-based programming of a voice-controlled device includes executing, by a voice-controlled device, an application for recognizing spoken programming commands, the application including a plurality of keyword phrases each associated with an action. The method includes receiving, by a voice-controlled device, an audio signal representing a user utterance. The method includes identifying, by the voice-controlled device, within the received audio signal, one of the plurality of keyword phrases and data for use in taking the action associated with the one of the plurality of keyword phrases. The method includes modifying, by the voice-controlled device, at least one data structure stored by the voice-controlled device responsive to the identified one of the plurality of keyword phrases and data.

In another aspect, a method for execution of an application generated via voice-based programming of a voice-controlled device includes receiving, by a voice-controlled device, an audio signal representing a first user utterance. The method includes identifying, by the voice-controlled device, within the received audio signal, an identification of an audio input triggering an action, an identification of the action, and an identification of data for use in taking the action. The method includes detecting, by the voice-controlled device, a second user utterance including the identified audio input triggering the action. The method includes executing the action using the identified data.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 4C and 4D depict examples of command templates;

FIG. 4H depicts one embodiment of a data structure representing associations between partitions of an audio signal including commands, actions, and data to be used in taking actions;

FIG. 4I depicts an embodiment of a grammar accessed by the voice command recognition and programming application to determine whether and how take action upon the partitions of the audio signal.

DETAILED DESCRIPTION

The present disclosure relates to methods and systems for building, extending, and personalizing a program executable by a device that is voice-controlled, wherein the program itself is provided to the device via a sequence of one or more spoken commands. Users of such methods and systems may create and update an application program on a voice-controlled device using conversational speech and without being required to be skilled in computer science or computer programming.

Figure 1:
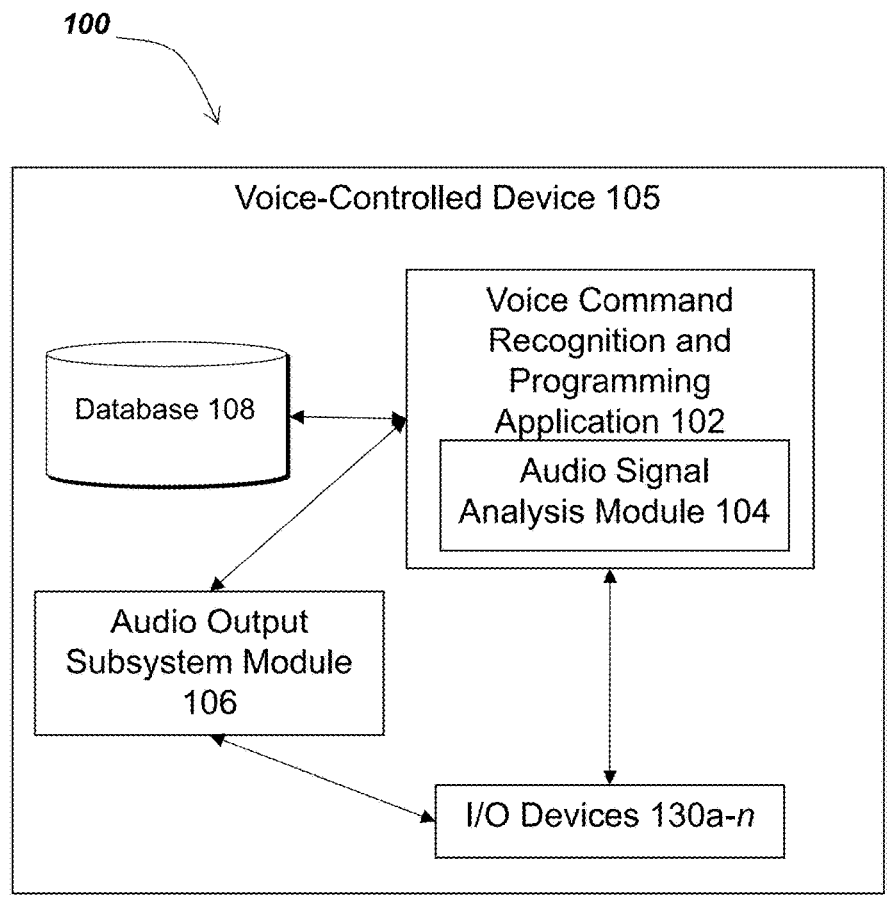
FIG. 1 is a block diagram depicting an embodiment of a system for voice-based programming of a voice-controlled device.

Referring now to FIG. 1, a block diagram depicts one embodiment of a system 100 for voice-based programming of a voice-controlled device. The system 100 includes a voice-controlled device 105, a voice command recognition and programming application 102, an audio signal analysis module 104, an audio output subsystem module 106, a database 108, and an input/output devices 130a-n.

The voice-controlled device 105 is a hardware device with functionality for receiving audio input, processing the audio as will be described in further detail below, and, optionally, providing output (including but not limited to audio output), based upon the processed audio input. The voice-controlled device 105 provides the input/output devices 130a-n, which may include one or more software or hardware components. For example, the voice-controlled device 105 may include at least one microphone for receiving audio input and a speaker for providing audio output. As another example, the voice-controlled device 105 may include an array of microphones. The voice-controlled device 105 is referred to as "voice-controlled" because it executes functionality for processing audio input and identifying one or more instructions within the audio input and executing the instructions, thus allowing a user to control the device 105 using her voice. Additionally, since the voice-controlled device 105 may be activated based on a spoken command from a user, the device may be referred to as a voice-activated device. Since execution of some instructions will involve the playback of audio output (e.g., via speakers or other I/O devices 130), which a user may experience as a "response" to her statements, the voice-controlled device 105 may also be referred to as a voice-response device 105. The voice-controlled device 105 may include customized functionality to execute the methods and systems described herein as well as the functionality of wireless speakers with built-in voice control, which are sometimes known as "smart speakers." The voice-controlled device 105 may include customized functionality to execute the methods and systems described herein as well as the functionality of a home robot. The voice-controlled device 105 may include customized functionality to execute the methods and systems described herein as well as the functionality of an industrial control panel. The voice-controlled device 105 may include customized functionality to execute the methods and systems described herein as well as the functionality of a robotic vacuum cleaner. In each instance in which a voice-controlled device 105 provides customized functionality to execute the methods and systems described herein as well as the functionality of another device, the grammars relied upon by the voice command recognition and programming application 102 (described in more detail below) may be customized to suit the functionality provided by the particular hardware provided.

The voice-controlled device 105 may execute a voice command recognition and programming application 102. In some embodiments, the voice command recognition and programming application 102 is a software program. In other embodiments, the voice command recognition and programming application 102 is a hardware module. In further embodiments, the voice command recognition and programming application 102 includes both software and hardware elements. The voice command recognition and programming application 102 may include functionality for performing coarse-grain analyses of audio signals including digitized speech. The voice command recognition and programming application 102 may include functionality for performing speech-to-text translation. The voice command recognition and programming application 102 may include functionality for performing text-to-speech translation. The voice command recognition and programming application 102 may include functionality for combining different techniques for natural language processing and performing natural language processing with such hybrid techniques.

The audio signal analysis module 104 may provide the audio processing functionality of the voice command recognition and programming application 102. In some embodiments, the audio signal analysis module 104 is a software program. In other embodiments, the audio signal analysis module 104 is a hardware module.

In some embodiments, the voice command recognition and programming application 102 provides a grammar that an application programmer may use to create or modify applications or application data on the voice-controlled device 105. As will be understood by those of ordinary skill in the art, grammars provide one or more rules regarding (1) which user utterances are to be recognized as programming statements including at least one keyword or keyword phrase and (2) which actions the voice command recognition and programming application 102 is to take upon recognition of the keyword or keyword phrase. In some embodiments, the grammar is included in the programming code that implements the grammar. In other embodiments, the grammar is implemented as a data structure, such as a table, that the voice command recognition and programming application 102 may access during interaction with a user. For example, the grammar may be implemented as a table having a row with three columns for each keyword phrase, such as, without limitation, a column for the keyword phrase itself (e.g., "when you hear"), a column for an action to be taken (e.g., "begin monitoring for subsequent utterances"), and optionally data upon which to act (e.g., an identification of the data for which to monitor). In some embodiments, a manufacturer of a device defines the grammar of the conversational programming language embedded in the device. By way of example, the manufacturer might have the user enter a programming mode application by saying "Enter programming mode" and another manufacturer may have the user say "Start programming." The installed grammar may be referred to as a conversational programming grammar. The grammar of a conversational programming language installed in a home robot may be different than the grammar of the conversational programming language installed in a self-driving vehicle or industrial control panel. The conversational programming grammar may, therefore, be used to generate new conversational programs with which to interact with a voice-controlled device.

Keyword phrases identified within a grammar may be any phrases that a user may utter (or, in some embodiments, any sounds that a microphone of the voice-controlled device 105 may detect) in order to cause the voice command recognition and programming application 102 to take an action. Keyword phrases may also be phrases that are linked to other keyword phrases. As one, non-limiting example, a grammar may include a first keyword phrase "when you hear" and a second keyword phrase "you say." The voice command recognition and programming application 102 may then be configured to interpret a first audio signal including the statement "When you hear '[user-defined utterance]', then you say [user-defined response to the user-defined utterance]'" and to determine that "when you hear" is associated with a command to begin listening for subsequent audio inputs that include the sounds that occur between "when you hear" and "then you say" before taking a second action. The voice command recognition and programming application 102 may also be configured to extract the portion of the audio signal occurring between "when you hear" and "then you say" and storing the extracted portion in a database or other structure in the memory of the device 105. For example, if the voice command recognition and programming application 102 receives the audio input "When you hear 'Aunt Mabel', you say 'delightful lady'", the voice command recognition and programming application 102 may take a first action of beginning monitoring of subsequent audio inputs to determine whether any subsequent audio inputs include the phrase "Aunt Mabel" and, upon identification of an audio input including the phrase, the voice command recognition and programming application 102 may initiate playback, by the voice-controlled device 105, of the user-defined response ("Delightful lady").

A programming statement within an audio input may be an alternating sequence of segments containing keyword phrases associated with an action to be taken and data to be manipulated in taking the action; the segments containing keyword phrases may be referred to as command segments and the segments containing data to be manipulated or acted upon may be referred to as name-value segments. The voice-controlled device 105 may also include functionality for partitioning statements into command segments and name-value segments. A received audio signal may contain more than one programming statement. A programming statement may include one or more keyword phrases. A programming statement may not include any data to be manipulated in taking the action; therefore, it should be understood that use of previously stored data is optional.

The voice-controlled device 105 may include the audio output subsystem module 106. In some embodiments, the audio output subsystem module 106 is a software program. In other embodiments, the audio output subsystem module 106 is a hardware module. The voice command recognition and programming application 102 may provide the functionality of the audio output subsystem module 106. The voice command recognition and programming application 102 may be in communication with the audio output subsystem module 106. The audio output subsystem module 106 may provide functionality for receiving a playback instruction identifying data for playback. The audio output subsystem module 106 may provide functionality for retrieving the data for playback (e.g., from a database such as the database 108). The audio output subsystem module 106 may provide functionality for directing one or more I/O devices 130 to playback the retrieved data.

In some embodiments, the voice-controlled device 105 executes functionality for storing data extracted from audio signals in a memory storage location of the voice-controlled device 105. In some embodiments, the voice-controlled device 105 may execute functionality for storing data extracted from audio input in a database 108. In embodiments in which extracted data is stored in a database, the database may be any type or form of database suitable for storing and providing access to extracted portions of audio signals. In some embodiments, the database 108 is an ODBC-compliant database. For example, the database 108 may be provided as an ORACLE database, manufactured by Oracle Corporation of Redwood Shores, Calif. In other embodiments, the database 108 can be a Microsoft ACCESS database or a Microsoft SQL server database, manufactured by Microsoft Corporation of Redmond, Wash. In other embodiments, the database 108 can be a SQLite database distributed by Hwaci of Charlotte, N.C., or a PostgreSQL database distributed by The PostgreSQL Global Development Group. In still other embodiments, the database 108 may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by ioGen, Inc., of New York, N.Y., and Cassandra databases distributed by The Apache Software Foundation of Forest Hill, Md. In further embodiments, the database may be any form or type of database.

Figure 2:
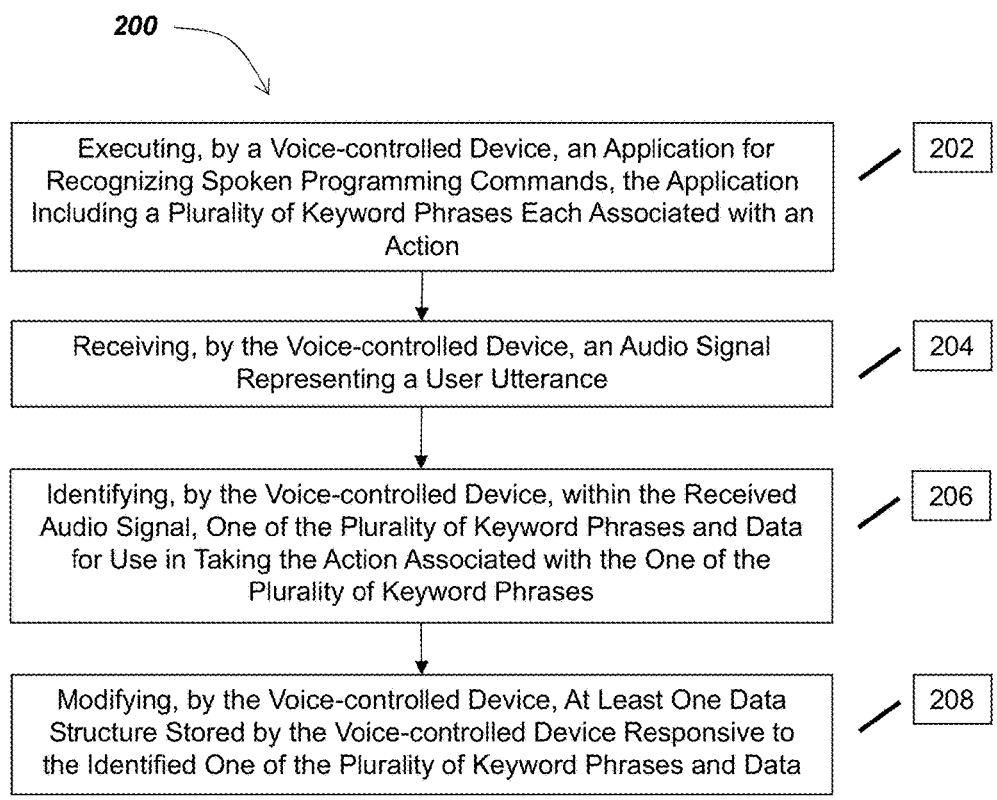
FIG. 2 is a flow diagram depicting an embodiment of a method for voice-based programming of a voice-controlled device.

Referring now to FIG. 2, a flow diagram depicts one embodiment of a method 200 for voice-based programming of a voice-controlled device. In brief overview, the method 200 includes executing, by a voice-controlled device, an application for recognizing spoken programming commands, the application including a plurality of keyword phrases each associated with an action (202). The method 200 includes receiving, by the voice-controlled device, an audio signal representing a user utterance (204). The method 200 includes identifying, by the voice-controlled device, within the received audio signal, one of the plurality of keyword phrases and data for use in taking the action associated with the one of the plurality of keyword phrases (206). The method 200 includes modifying, by the voice-controlled device, at least one data structure stored by the voice-controlled device responsive to the identified one of the plurality of keyword phrases and data (208).

Referring now to FIG. 2, in connection with FIG. 1, and in greater detail, the method 200 includes executing, by a voice-controlled device, an application for recognizing spoken programming commands, the application including a plurality of keyword phrases each associated with an action (202). The application may be the voice command recognition and programming application 102. The plurality of keyword phrases each associated with an action may be part of the grammar provided by the voice command recognition and programming application 102 and described above.

The method 200 includes receiving, by the voice-controlled device, an audio signal representing a first user utterance (204). The voice-controlled device 105 may receive the audio signal via an input/output device 130. For example, in some embodiments, an array of microphones detects one or more audio signals in an area surrounding the voice-controlled device 105, records the audio signals, and provides the recorded audio signals to the voice command recognition and programming application 102 for analysis.

The method 200 includes identifying, by the voice-controlled device, within the received audio signal, one of the plurality of keyword phrases and data for use in taking the action associated with the one of the plurality of keyword phrases (206). In some embodiments, the voice command recognition and programming application 102 identifies the one of the plurality of keyword phrases and data for use in taking the action associated with the one of the plurality of keyword phrases. The voice command recognition and programming application 102 may recognize more than one of the plurality of keyword phrases. In some embodiments, the voice command recognition and programming application 102 may determine that a particular audio signal representing a user utterance does not include any data for use in taking actions and that the action itself contains all the data needed (for instance, in the case of an action for creating or modifying a data structure, such as "create table").

By way of example, in an audio signal representing an utterance of "When you hear 'Aunt Mabel,' then you say 'delightful lady'", the voice command recognition and programming application 102 may identify the term "when you hear" as a keyword phrase that indicates the voice-controlled device 105 should monitor subsequent utterances for a user-provided phrase, which follows the "when you hear" in the audio signal; in this example, the data upon which to act (by monitoring subsequent utterances for signals containing the data) is "Aunt Mabel."

The voice command recognition and programming application 102 may include a keyword or keyword phrase for entering into a programming mode in which audio signals representing user utterances will be analyzed to determine whether they contain commands to generate new programs. For example, upon receiving an audio signal representing a user utterance of "start programming mode" or "new application" (for example), the voice command recognition and programming application 102 may interpret the audio signal as a command to begin applying a different grammar to subsequent utterances—that is, instead of applying a grammar for interpreting user commands as inputs to existing functionality already made available by the voice-controlled device 105, the voice command recognition and programming application 102 may apply a grammar for interpreting user commands as inputs for creating new functionality for the voice-controlled device 105. Upon receiving an audio signal representing a user utterance of a phrase to exit programming mode (e.g., "end programming mode"), the voice command recognition and programming application 102 may interpret the audio signal as a command to again change the grammar applied to subsequent utterances. As another example, the voice command recognition and programming application 102 may allow a user to enter into programming mode via a physical action, such as toggling a switch, inserting a key in a lock, or presenting an identity card to a reader.

In some embodiments, therefore, identifying one of the plurality of keyword phrases includes identifying one of the plurality of keyword phrases associated with a command to create a data structure in a memory store of the voice-controlled device. The examples described thus far suggest an interactive device in which the computer program is an instruction to perform a playback of a particular audio signal upon receiving a specific triggering signal (e.g., "When you hear [first user input], say [second user input]"). However, far more complex programs may be implemented using the methods and systems herein. By way of example, and without limitation, keyword phrases may be commands for creating new data structures—tables, trees, arrays, lists, images, matrices, heaps, or other types of data structures useful in computer programming. Therefore, the system will support a user in creating programs at whatever level of programming skill the user has. A user may wish to create a simple table for example and need only say "create a table named 'family'" and the voice command recognition and programming application 102 will recognize the command "create a table" and the command "named" and the data "family" as a command to create a new table and name the table "family," presuming there is a grammar installed that supports table creation and naming.

When operating in programming mode, the voice command recognition and programming application 102 may determine whether received audio signals include any portions that represent an utterance matching a keyword phrase included in a grammar of the voice command recognition and programming application 102. If the voice command recognition and programming application 102 does not find such an utterance represented in the audio signal, the voice command recognition and programming application 102 may instruct the audio output subsystem module 106 to playback feedback to the user to that effect (e.g., by instructing the audio output subsystem module 106 to playback data stored at a particular location that includes a representation of an utterance including a phrase such as "invalid comment"). If the voice command recognition and programming application 102 does find such an utterance represented in the audio signal, the voice command recognition and programming application 102 takes the actions identified within the grammar and associated with the recognized phrase(s).

The method 200 includes modifying, by the voice-controlled device, at least one data structure stored by the voice-controlled device responsive to the identified one of the plurality of keyword phrases and data (208). Continuing with the above example, a user may say "add 'sally green' to the family table" and, again presuming installation of a supporting grammar, the voice command recognition and programming application 102 will identify a command to add data to a table having a particular name and identify "sally green" as the data to be added. Users may then create new programs that rely on the system's ability to identify the data representing "sally green" as associated with or stored in a table named "family." Thus, a user conceptually understanding that a table may store a list of names and relationships within a family may wish to generate such a table and the system 100 allows the user to do so without having to learn a variety of programming languages and skills to do so.

The system 100 may provide acknowledgement of execution of a command. For example, the system 100 may use the audio output subsystem module 106 to playback voice output confirming the receipt of the instruction and/or execution of the instruction.

Figure 3:
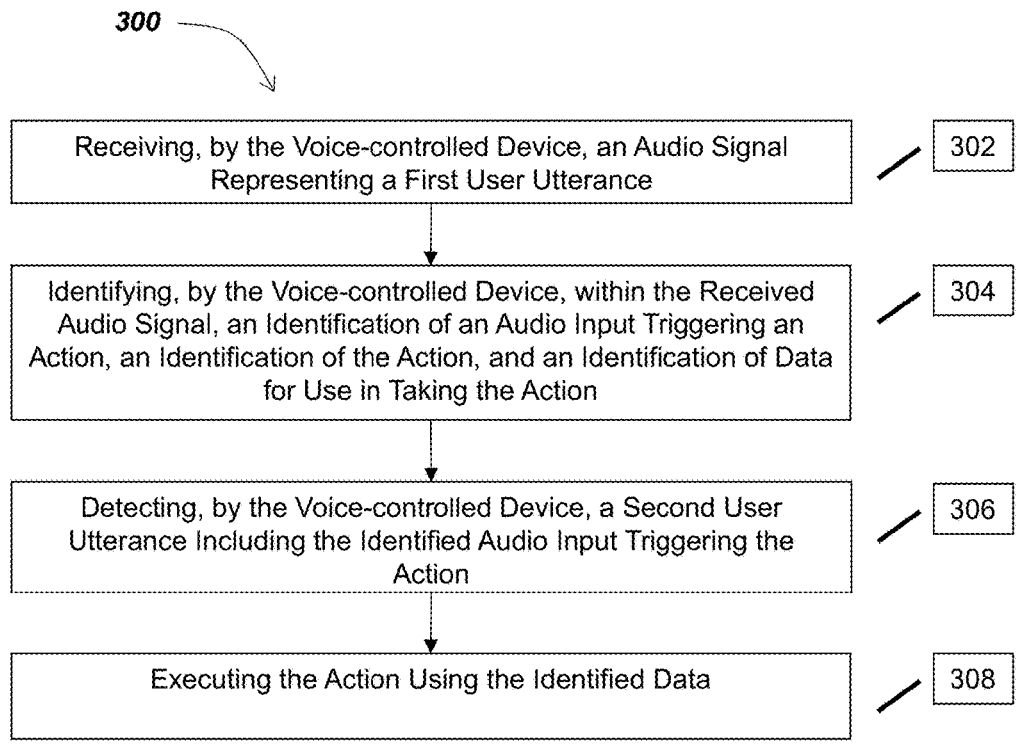
FIG. 3 depicts an embodiment of a method for execution of an application generated via voice-based programming of a voice-controlled device.

Referring now to FIG. 3, a flow diagram depicts one embodiment of a method 300 for execution of an application generated via voice-based programming of a voice-controlled device. In brief overview, the method 300 includes receiving, by a voice-controlled device, an audio signal representing a first user utterance (302). The method 300 includes identifying, by the voice-controlled device, within the received audio signal, an identification of an audio input triggering an action, an identification of the action, and an identification of data for use in taking the action (304). The method 300 includes detecting, by the voice-controlled device, a second user utterance including the identified audio input triggering the action (306). The method 300 includes executing the action using the identified data (308). The voice-controlled device 105 may be under the control of an application program such as, for example, the voice command recognition and programming application 102.

Referring now to FIG. 3, in connection with FIGS. 1-2, and in greater detail, a method 300 includes receiving, by a voice-controlled device, an audio signal representing a first user utterance (302). The voice-controlled device 105 may receive the audio signal as discussed above in connection with FIGS. 1-2. The voice command recognition and programming application 102 may be in programming mode when the audio signal representing the first user utterance is received.

The method 300 includes identifying, by the voice-controlled device, within the received audio signal, an identification of an audio input triggering an action, an identification of the action, and an identification of data for use in taking the action (304). In one embodiment, the identification of the audio input triggering an action includes a command to begin monitoring subsequent user utterances for the identified audio input triggering the action. In another embodiment, the identification of the action includes a command to execute an audio output subsystem for playback of stored data. In such an embodiment, the stored data is the data identified within the audio signal as the data for use in taking the action. By way of example, the received audio signal may represent an utterance including the words "when you hear Aunt Mabel, say delightful lady" and "when you hear" may be a keyword phrase within a grammar provided by the voice command recognition and programming application 102 as a command to begin monitoring subsequent user utterances for the identified audio input that will trigger an action and "Aunt Mabel" is the audio input that triggers the action. Continuing with this example, "say" is the command to execute the audio output subsystem for playback of stored data ("delightful lady") for use in taking the playback action. The system 100 may include functionality for extracting the data to be used in taking the action (the portion of the audio signal representing the utterance "delightful lady") and for storing the data for later retrieval. It should be understood that the data stored for monitoring or for later playback may include audio signals representing sounds other than human speech, such as engine noises, clapping hands, animal sounds (purrs or barks, for example), or other sounds.

As another example, an audio signal representing the first user utterance may represent a series of commands for generation of a new program. That is, conversational programs as described herein may be created by means of multiple programming statements. For example, the audio signal may include a series of commands to create and populate a table that may be queried. The user may enter programming mode and state "create a table named birthday"; the voice command recognition and programming application 102 may recognize a "create a table" command and proceed to generate a new table in memory and name the table 'birthday.' Continuing with this example, the audio signal may include an utterance of "Put 'Uncle Fred' in the first column of the first row of the birthday table; put 'March fifteenth' in the second column of the first row of the birthday table." The system 100 may recognize "put" and "in" as commands to store the data following "put" in the generated table at the location specified by the data following "in"—for example, by querying a data structure containing a grammar for the keyword "put" and retrieving a command to store the data following "put" in the generated table (as opposed to, for example, using the data following "put" for a name of a data structure or storing the audio signal portion containing the data following "put" for later re-play.

Continuing with the example of the birthday table above, and providing examples of the use of variables and conditional statements by the voice command recognition and programming application 102, the user may state, "When you hear 'when is wordage birthday,' set name to 'wordage'" and "If name is in birthday table say column two, otherwise say 'I don't know name's birthday.'" The word "set" following a "when you hear" command may be associated in a grammar with a command to store the data between "when you hear" and "set" in a variable specified after "set" and before "to" and the value of the variable is referred to as "wordage," which itself may be included in a grammar as a keyword that is associated with the action of extracting data in the audio signal at the point between two known utterances.

The method 300 includes detecting, by the voice-controlled device, a second user utterance including the identified audio input triggering the action (306). As indicated above, the system 100 may identify a command to begin monitoring subsequent utterances for particular phrases. The voice command recognition and programming application 102 may be out of programming mode when an audio signal representing the second user utterance is received. Using the one or more microphones 130, the system 100 may determine that a user utterance occurring within range of the one or more microphones 130 includes the specified phrase.

Therefore, the system 100 may include functionality for receiving audio signals representing user utterances, determining whether the utterance contains a phrase the system 100 has been instructed to monitor for, and, if so, take an action identified in association with the phrase. This process may include gathering data needed to execute the instructions, such as searching a database to identify a location in a data structure of data to be acted upon. If there are multiple actions to be taken, the voice command recognition and programming application 102 may keep a list of actions and may update the list as actions are executed.

The method 300 includes executing the action using the identified data (308). Upon recognition of the phrase identified in the first utterance, the system 100 may take the action identified in the first utterance. Continuing with the example above where the audio signal represented the utterance of "when you hear Aunt Mabel, say delightful lady", upon determining that a second utterance includes "Aunt Mabel," the voice command recognition and programming application 102 may instruct the audio output subsystem module 106 to playback "delightful lady." Continuing with the birthday table example from above, if the voice command recognition and programming application 102 subsequently hears "When is Uncle Fred's birthday?", the voice command recognition and programming application 102 matches 'when is' to the 'when is' data within the "when you hear" instruction and matches 'birthday' to the 'birthday' data within the "when you hear" instruction and takes the action of associating with the keyword "wordage" all the audio between "when is" and "birthday." In this example, the voice command recognition and programming application 102 then sets the value of a variable named "name" to the value of the variable named "wordage" and both "name" and "wordage" will have the value of "Uncle Fred's" in this example. Regarding the final clause of the utterance—"Otherwise say 'I don't know name's birthday.'"—if the voice command recognition and programming application 102 determines that column two of the table named birthday is blank or the name is not in the birthday table at all, the voice command recognition and programming application 102 retrieves the value of the variable "name" and executes the command to playback the alternative audio of "I don't know Uncle Fred's birthday."

In some embodiments, the system 100 includes a speech-to-text translation engine. In such embodiments, the system 100 may provide received audio signals to the speech-to-text translation engine and the speech-to-text translation engine may apply language processing techniques to generate text representative of the phrases uttered and captures in the audio signal. The speech-to-text translation engine may then make the text accessible to the voice command recognition and programming application 102, which may in turn analyze the text to identify commands, keyword phrases, variables, and other aspects of the text, identifying various portions of the text and using the identified subsets of text to take the actions described above. For example, in some embodiments, the audio signal analysis module 104 may include such a speech-to-text translation engine. However, in other embodiments, no such speech-to-text translation engine is required and the voice command recognition and programming application 102 need not parse or act on translated text.

Figure 4A:
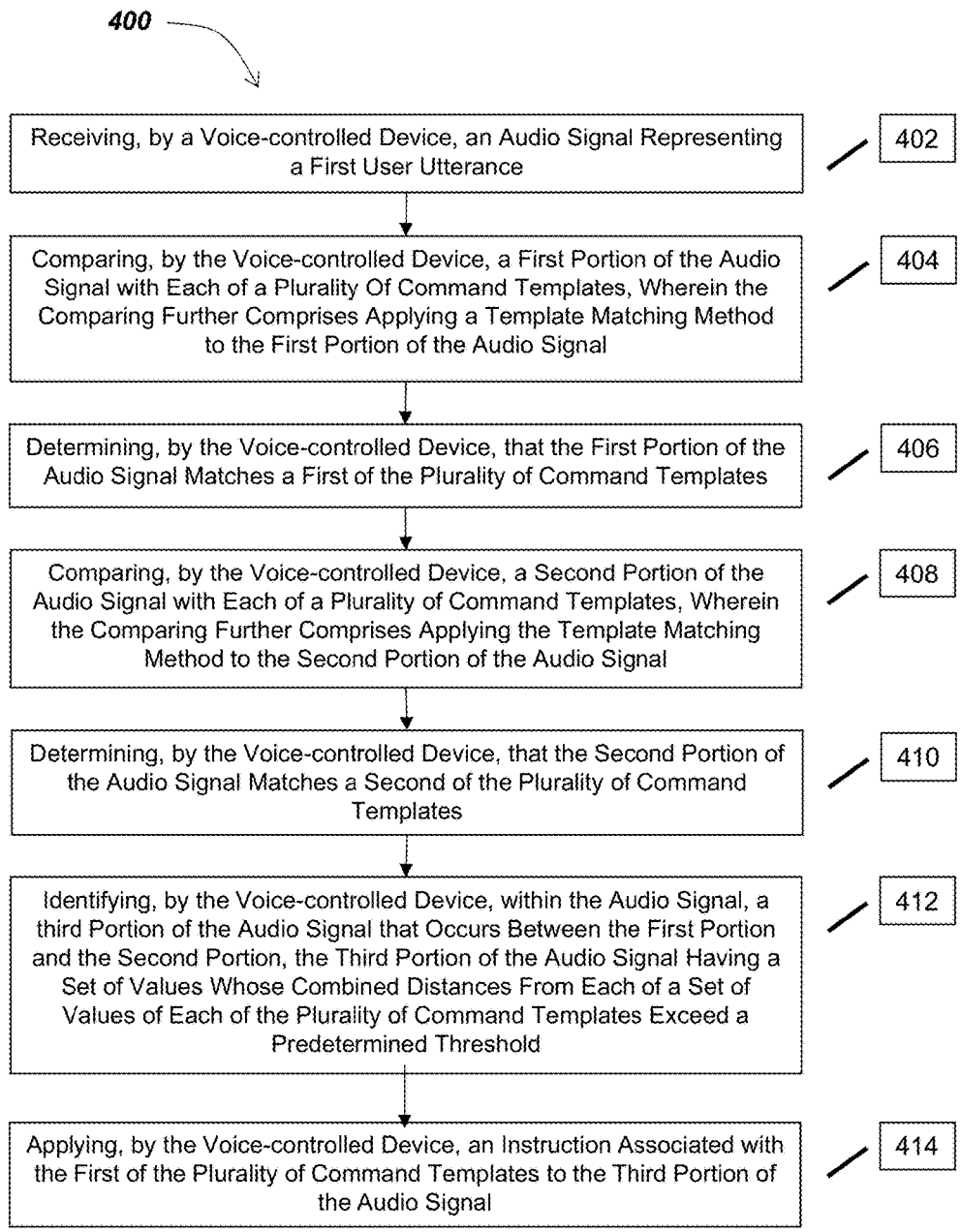
FIG. 4A depicts an embodiment of a method for voice-based programming of a voice-controlled device.

Referring now to FIG. 4A, a flow diagram depicts one embodiment of a method 400 for voice-based programming of a voice-controlled device. In brief overview, the method 400 includes receiving, by a voice-controlled device, an audio signal representing a first user utterance (402). The method 400 includes comparing, by the voice-controlled device, a first portion of the audio signal with each of a plurality of command templates, wherein the comparing further comprises applying a template matching method to the first portion of the audio signal (404). The method 400 includes determining, by the voice-controlled device, that the first portion of the audio signal matches a first of the plurality of command templates (406). The method 400 includes comparing, by the voice-controlled device, a second portion of the audio signal with each of a plurality of command templates, wherein the comparing further comprises applying the template matching method to the second portion of the audio signal (408). The method 400 includes determining, by the voice-controlled device, that the second portion of the audio signal matches a second of the plurality of command templates (410). The method 400 includes identifying, by the voice-controlled device, within the audio signal, a third portion of the audio signal that occurs between the first portion and the second portion, the third portion of the audio signal having a set of values whose combined distances from each of a set of values of each of the plurality of command templates exceed a predetermined threshold (412). The method 400 includes applying, by the voice-controlled device, an instruction associated with the first of the plurality of command templates to the third portion of the audio signal (414).

Referring now to FIG. 4A in greater detail and in connection with FIGS. 1-3, the method 400 includes receiving, by a voice-controlled device, an audio signal representing a first user utterance (402). As described above, the voice-controlled device 105 may include one or more microphones 130 that receive the audio signal represent the first user utterance. In one embodiment, the audio signal analysis module 104 has access to the audio signal (e.g., to a location, such as the database 108, in which the audio signal is stored). As described above, receiving the audio signal may include receiving an audio signal including an alternating sequence of command segments and non-command segments, wherein each of the command segments matching one of the plurality of command templates and wherein the non-command segments do not match any of the plurality of command templates.

The method 400 includes comparing, by the voice-controlled device, a first portion of the audio signal with each of a plurality of command templates, wherein the comparing further comprises applying a template matching method to the first portion of the audio signal (404). The system 100 may implement coarse-grain analysis of digitized speech, rather than fine-grain analysis—that is, rather than seeking to identify subcomponents of spoken words (such as phonemes) that are then combined to yield word recognition and subsequent conversion to text, the system 100 identifies sequences of words in their entirety where an audio signal representing an utterance of a sequence of words matches an audio signal in an audio template associated with a known value. The method 400 includes receiving the digitized audio signal and comparing portions of the digitized audio signal with command templates, which include portions of audio signals which are associated with known values. A manufacturer of the voice-controlled device 105 may include the plurality of command templates in the software executed by the voice-controlled device 105. The method may include receiving a second (or subsequent) audio signal including at least one command template. The system 100 may include functionality for storing the plurality of command templates. The system 100 may include functionality for associating at least one of the plurality of command templates with an execution instruction (e.g., specifying an action to take upon determining that an audio signal includes a portion that matches the associated command template).

Figure 4B:
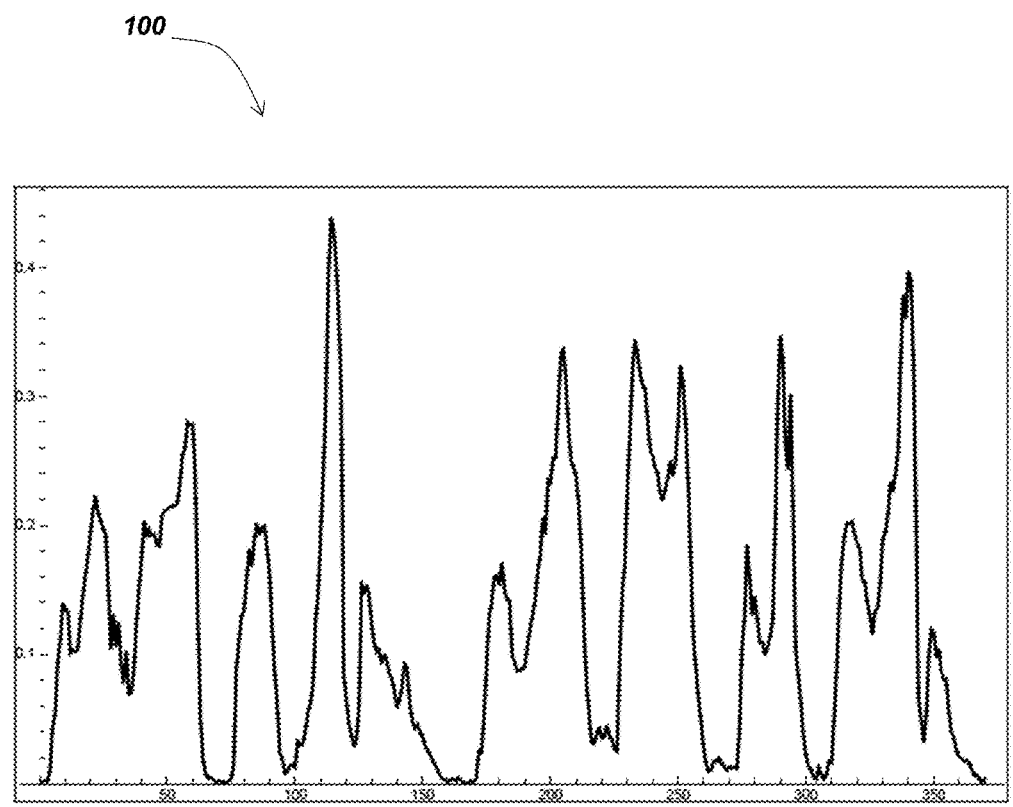
FIG. 4B depicts an embodiment of a plot of a subset of values sampled from a set of values in a digitized sound.

By way of example, a microphone or microphones in the voice-controlled device 105 may digitize sound at 16,000 bits per second. The owner's programming utterance caused 74,098 32-bit floating point numbers to be delivered to the voice command recognition and programming application 102 in the voice-controlled device 105. These numbers are the digitization of the analog audio wave impinging on the microphone during the vocalization. To analyze the digitized wave form as human speech, 74,098 floating point numbers can be mathematically reduced to a smaller set of numbers that still faithfully represent the words spoken. For example, the voice command recognition and programming application 102 may average the absolute value of the sample values over each 12.5 milliseconds of speech or what is the same thing over every 200 samples, but it is understood that other methods of data reduction for this purpose are possible. Performing this averaging on the 74,098 samples produces 370 floating point numbers. These 370 values may be referred to as the sample values, although it is understood that they are in fact averages of sample values as delivered by the microphone in the voice-controlled device 105 to the voice command recognition and programming application 102. FIG. 4B depicts a plot of the 370 sample values taken from a digitization of the utterance "When you hear 'Aunt Mabel' then you say 'Delightful Lady'".

The voice command recognition and programming application 102 may take a set of values such as those plotted out in FIG. 4A and partition the sequence of values into one or more portions of the audio signal. Some of those portions will match audio signals that are contained in template files associated with a command; such portions may be referred to as command segments. Others of those portions will not match a command segment and the voice command recognition and programming application 102 will determine that those portions include instead of commands data to be acted upon by the system in connection with a command (e.g., include audio to be played back or data to be used in modifying data structures underlying a program of the voice-controlled device 105); these portions may be referred to as name-value segments. FIGS. 4C and 4D depict examples of command templates, with FIG. 4C depicting a command template associated with the keyword phrase "When you Hear" and FIG. 4D depicting a command template associated with the keyword phrase "Then You Say."

Referring back to FIG. 4A, the method 400 includes determining, by the voice-controlled device, that the first portion of the audio signal matches a first of the plurality of command templates (406). The voice-controlled device 105 may execute an application for comparing portions of audio segments and performing course-grain analysis of audio signals including digitized speech. The voice command recognition and programming application 102 may include the functionality for comparing portions of audio segments and performing course-grain analysis of audio signals including digitized speech; alternatively, a separate application may provide the functionality.

The voice command recognition and programming application 102 may determine a distance between a first value in the first portion of the audio signal and a second value in the one of the plurality of command templates. The voice command recognition and programming application 102 may determine that the determined distance between the first value and the second value is below a predetermined threshold.

Figure 4E:
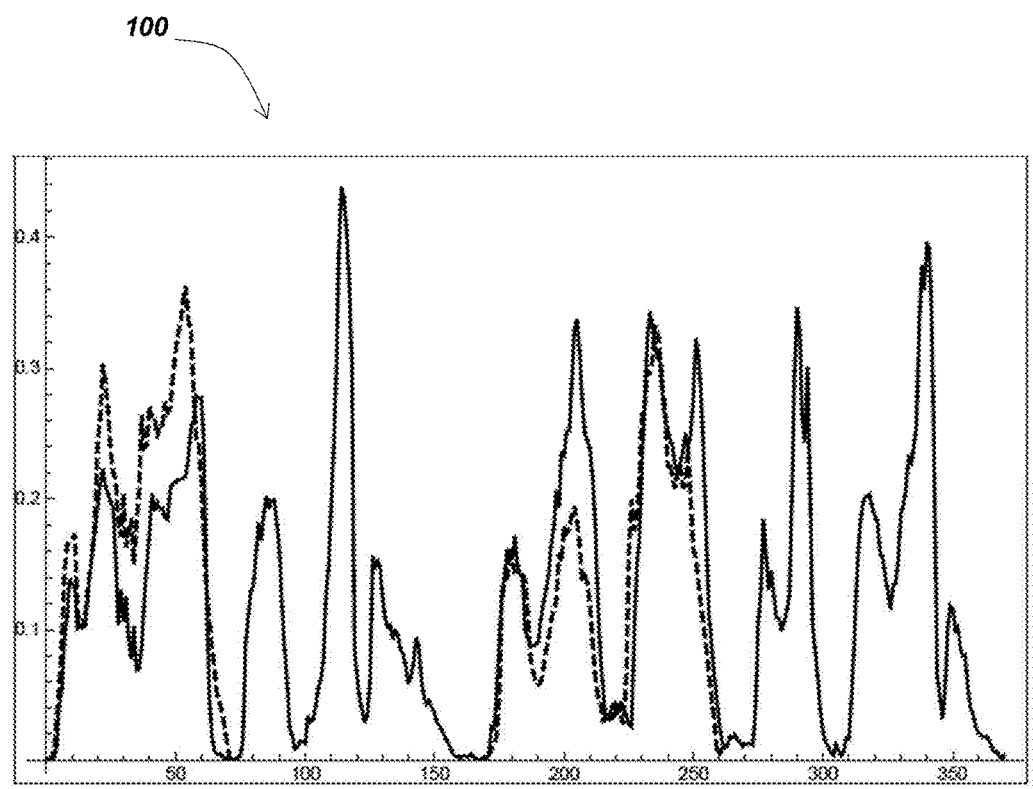
FIG. 4E depicts an example of an overlay of a command template on an audio signal.

In one embodiment, the voice command recognition and programming application 102 overlays a representation of a command template on a portion of a representation of the audio signal to make the comparison. As represented by FIG. 4E, when the command template (represented by dashed lines) is overlaid on the audio signal (represented by solid lines), there is overlap at the points in the audio signal that contain values matching the values of the command template. In this way, the voice command recognition and programming application 102 determines which portions of the audio signal contain command segments and determines that the portions of the audio signal occurring between two command segments (and not themselves matching any command template) are name-value segments corresponding to the preceding command segment. The voice command recognition and programming application 102 may retrieve a keyword phrase associated with the command template and associate the retrieved keyword phrase with the identified command segment portion of the audio signal.

Figure 4F:
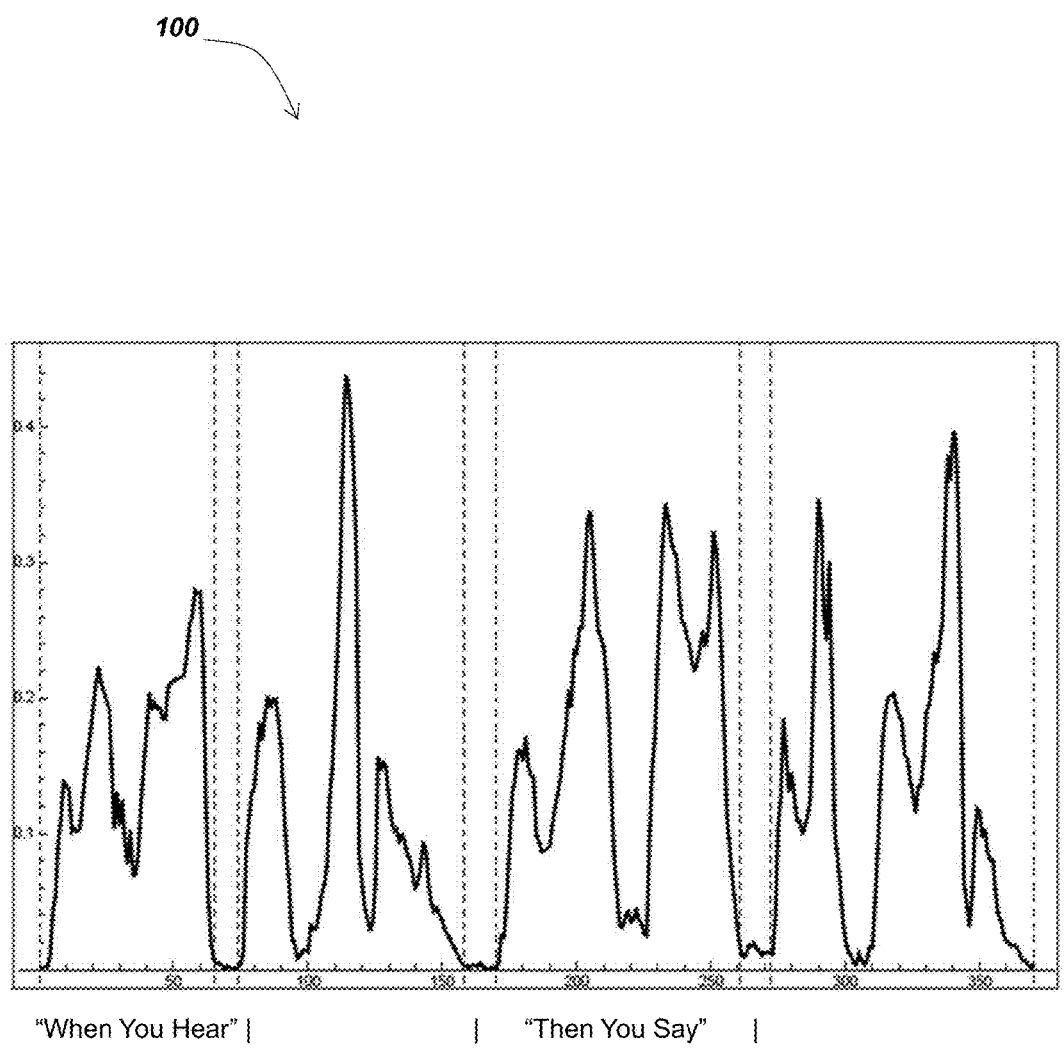
FIG. 4F depicts one embodiment of how a voice command recognition and programming application may determine to partition an audio signal into command segments and name-value segments.

FIG. 4F depicts an example of how the voice command recognition and programming application 102 may determine to partition an audio signal into command segments and name-value segments. As shown in FIG. 4F, the voice command recognition and programming application 102 may associate a portion of the audio signal with a keyword phrase associated with the command template. However, in some embodiments, the voice command recognition and programming application 102 does not label the name-value segments because it does not have a value associated with the name-value segment to assign—not having performed speech-to-text translation of any portion of the audio signal, the voice command recognition and programming application 102 may store the portion of the audio signal between two command segments and may refer to the stored portion as a name value segment but does not actually "know" that the stored portion sounds like "Aunt Mabel" or "Delightful Lady" to a human listener. Nor does the voice command recognition and programming application 102 need to put the resources into translating the signal when simply storing it and a pointer to where it may be found may suffice.

The method 400 may include executing a template matching module for determining if one audio signal appears in another and, if so, where it occurs. One approach, as indicated above, begins with the definition of a distance between a template and a segment of an audio signal. Ifs is an interval of the segment and t is the template, then the distance between t and s may be denoted as D(s, t). Then, for example, that the template was given by three values, such that t={(1, 3.4), (2, 5.6), (3, 2.1)} and the audio signal was given by five values, such that s={(1, 8.2), (2, 4.7), (3, 3.8), (4, 0.2), (5, 1.9)}. Then the distance between the template and the signal could be taken to be the sum of distances between corresponding points: D(s, t)=|3.4−8.2|+|5.6−4.7|+|2.1−3.8|=7.4. The smaller the value of D, therefore, the more closely the template matches the signal. If we shifted the template to the right by one time unit, such that t={(2, 3.4), (3, 5.6), (4, 2.1)}, then D(s, t)=|3.4−4.7|+|5.6−3.8|+|2.1−0.2|=5.0. If we expanded the template along the time dimension, such that t={(1, 3.4), (3, 5.6), (5, 2.1)}, then D(s, t)=|3.4−8.2|+|5.6−3.8|+|2.1−1.9|=6.8. Given a template and a signal, the method therefore includes minimizing a distance measure over transformations (shift, expand, etc.) of the template and portions (beginning, middle, end, etc.) of the signal. The portion of the signal minimizing the distance locates a possible appearance of the template in the signal and the minimum value of the distance measures the certainty of the appearance.

Figure 4G:
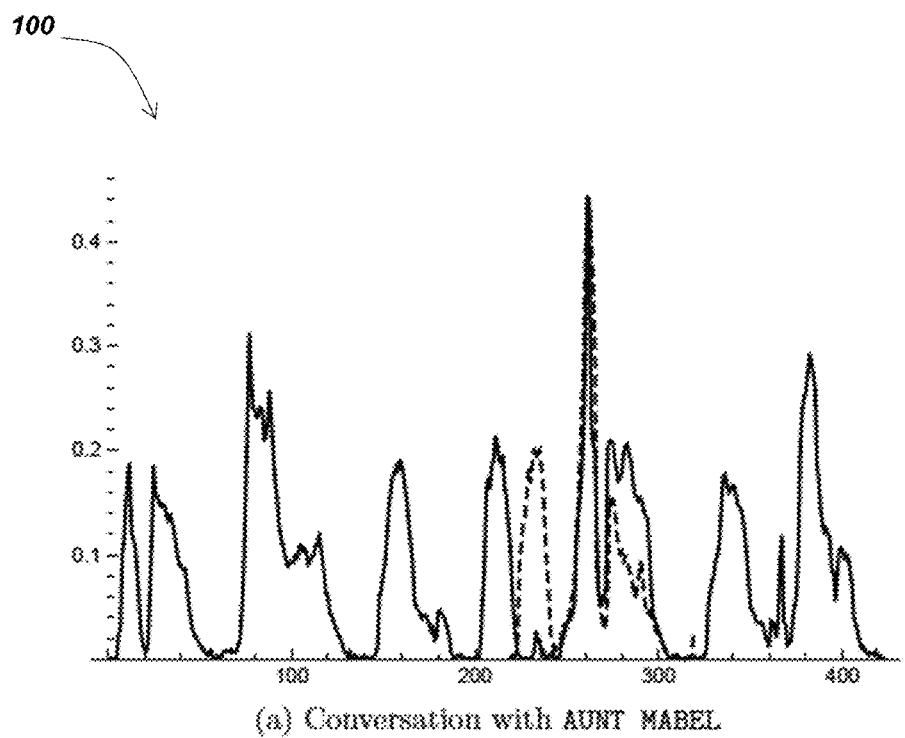
FIG. 4G depicts an embodiment in which a system for voice-based programming of a voice-controlled device shifted a name-value template across a representation of an audio signal of a conversation that contains a phrase and across an audio signal of a conversation that does not contain the phrase, showing the overlay of the template on each signal.
Figure 4G:
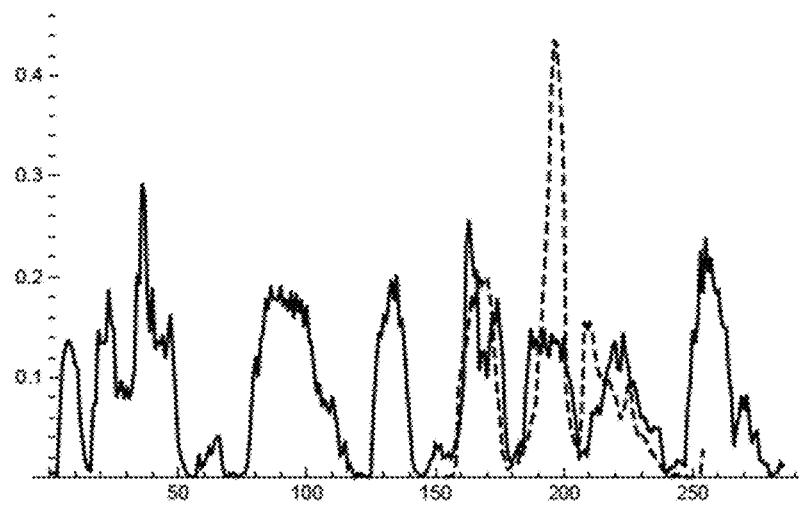

FIG. 4G depicts an embodiment in which the system 100 shifted a name-value template across a representation of an audio signal of a conversation that contains a phrase ("Aunt Mabel") and across an audio signal of a conversation that does not contain the phrase, showing the overlay of the template on the signal. As shown in the example provided by FIG. 4G, the name-value template—which may have been extracted from a previously received audio signal—matches the conversation that includes the phrase at a shift of 218 time units while matching the conversation that does not include the phrase at a shift of 153 time units. Continuing with this example, the minimum distance measure of the shifts of the name-value template at the shift of 218 time units was 5.8 and it could be reduced to 4.4 (e.g., via optimizing transformations); the minimum distance measure when compared to the conversation that does not include the phrase is 6.2, which can be reduced to 4.9 via re-scaling optimizations.

The method 400 includes comparing, by the voice-controlled device, a second portion of the audio signal with each of a plurality of command templates, wherein the comparing further comprises applying the template matching method to the second portion of the audio signal (408). The method 400 includes determining, by the voice-controlled device, that the second portion of the audio signal matches a second of the plurality of command templates (410). Determining that the second portion of the audio signal matches one of the plurality of command templates further comprises determining a distance between a first value in the second portion of the audio signal and a second value in the one of the plurality of command templates, as described above. Determining that the determined distance between the first value and the second value is below a predetermined threshold, as described above. The method 400 includes identifying, by the voice-controlled device, within the audio signal, a third portion of the audio signal that occurs between the first portion and the second portion, the third portion of the audio signal having a set of values whose combined distances from each of a set of values of each of the plurality of command templates exceed a predetermined threshold (412). The voice command recognition and programming application 102 may repeat the steps described above to compare portions of the audio signal with command templates until it has analyzed the entirety of the audio signal and identified each command segment.

Having determined which portions of the received signal match command templates and, therefore, contain command segments and which portions do not match command segments and, therefore, contain name value segments, the voice command recognition and programming application 102 may populate a data structure based on the partitioned signal. Referring to FIG. 4H and FIG. 4I, FIG. 4H depicts one embodiment of a data structure representing associations between partitions of an audio signal including commands, actions, and data to be used in taking actions. In one embodiment, when the voice command recognition and programming application 102 receives an audio signal, the voice command recognition and programming application 102 compares a plurality of portions of the received audio signal to each value in column labeled "Name Value Segment" (or retrieves an audio signal stored at a location identified within the column labeled "Name Value Segment") and determines whether there is a match between the two signals; if there is, the voice command recognition and programming application 102 directs the output of the value in (or pointed to by) the name value segment corresponding to the action to be taken. FIG. 4I depicts an embodiment of a grammar accessed by the voice command recognition and programming application 102 to determine whether and how to take action upon the partitions of the audio signal. Although represented in a human-readable context by FIGS. 4H and 4I, for clarity, it should be understood that the data stored may be in computer-processable formats (e.g., including audio files, programming code, and/or structured content processable by a machine). By way of example, the name-value segment following "when you hear" may be the text "Aunt Mabel" as depicted or an audio file or a pointer to an audio file stored by the voice-controlled device 105.

The method 400 includes applying, by the voice-controlled device, an instruction associated with the first of the plurality of command templates to the third portion of the audio signal (414). As indicated above, the voice command recognition and programming application 102 determined a keyword phrase associated with a command template, and thus with a command segment of the audio signal; the voice command recognition and programming application 102 may then access the portion of the grammar relating to the keyword phrase (e.g., by querying a data structure containing the grammar for the keyword phrase) and identify an action to take. If the action requires the use of the name-value segment, the voice command recognition and programming application 102 accesses and uses the name-value segment in accordance with the grammar. By way of example, if the keyword phrase is "when you hear" and the associated action is "activate microphones and begin monitoring" (as shown in FIG. 4H), the voice command recognition and programming application 102 may activate at least one microphone 130 and begin receiving input from the microphone 130 and applying the template matching process described above to all input until it determines it has identified a portion of the input that matches the name-value segment that followed "when you hear" and preceded "then you say" in the audio signal. Upon identifying such input, the voice command recognition and programming application 102 may then proceed to querying the grammar for an action associated with the keyword "then you say" and take the identified action.

As will be understood, each program statement is understood to include at least one keyword phrase and may include an alternating sequence of pre-defined keyword phrases and arbitrary audio signals. Unlike a conventional system for speech-to-text recognition, which can only parse signals for which it has a definition, embodiments of the methods and systems described herein provide functionality for receiving and manipulating audio signals for which the system has no definition. As shown in the examples above, the system need not be able to translate an audio signal such as "Aunt Mabel" or "delightful lady" into computer-recognizable text or other representation in order to extract the signals and manipulate them, and the device 105, in accordance with programming instructions.

Therefore, it will be understood that the system 100 includes functionality for identifying, by the voice-controlled device, within the audio signal, a fourth portion of the audio signal that occurs after the second portion of the audio signal, the fourth portion of the audio signal having a set of values whose distances from a set of values of each of the plurality of command templates exceed a predetermined threshold; determining, by the voice-controlled device, that the fourth portion of the audio signal does not match any of the plurality of command templates; and applying, by the voice-controlled device, an action associated with the second of the plurality of command templates to the fourth portion of the audio signal. By way of example, the method may include determining to apply an action of extracting and storing for future use a portion of the audio signal following the portion of the audio signal that represents the user utterance "then you say." The method may include receiving, by the voice-controlled device, a second audio signal representing a second user utterance; determining that a portion of the second audio signal matches the third portion of the audio signal representing the first user utterance; and applying the action associated with the second of the plurality of command templates to the fourth portion of the audio signal representing the first user utterance. The method may include generating a new data structure storing data represented by the third portion of the audio signal, in a memory store of the voice-activated device. The method may include modifying data stored by a data structure stored by the voice-activated device, the modified data representing data extracted from the third portion of the audio signal. The method may include extracting, by the voice-controlled device, the third portion of the audio signal; storing, by the voice-controlled device, the extracted third portion of the audio signal; retrieving, by an audio output subsystem of the voice-controlled device, the stored third portion of the audio signal; and playing, by the audio output subsystem, the stored third portion of the audio signal based on a playback instruction associated with the second portion of the audio signal.

One advantage of implementing embodiments of the methods and systems described above is that new user utterances may become utterances recognized in voice-activated and voice-response application language without being built into the hardware device a priori. Further, by virtue of not converting speech to text but rather by dealing with the digitized audio signals per se, some embodiments of the methods and systems herein can be programmed to recognize and respond to utterances such as family names that are unlikely to be found in a pre-built system (and unlikely to be pronounced in a manner desired by the speaker), as well as sounds other than vocalizations such as engine noises, clapping hands, animal sounds and other non-human sounds. Furthermore, the actions to be taken need not be limited to playback of audio files but may include manipulation of physical attributes of the voice-controlled device 105; for example, the action to take may be to lock or unlock the door or to move a portion of the device 105 (e.g., wag a tail on a robotic pet, move the device along a certain coordinate path, etc.). Therefore, users of the methods and systems described herein can extend and personalize existing capabilities of voice-activated and voice-response devices, as well as add new capabilities by engaging in a structured voice conversation with their devices.

Another advantage of implementing embodiments of the methods and systems described above is that, as illustrated by the descriptions and examples above, the application programmer is not required to acquire any additional hardware or software in order to update an application on the device. The device itself embodies all the functionality necessary for its own updating. Furthermore, the device does not need to be connected to a network in order to be updated. Finally, the application programmer is not required to become skilled in any text-based programming languages nor does the application programmer need to become skilled in the use of any web-based application program development environments.

Although the examples above focused on voice-controlled devices such as smart speakers that involved conversational speech with users, other types of devices may be modified or manufactured to include the functionality to execute the methods and systems described herein including devices such as those useful as part of industrial control systems, physical access control systems, and home health systems.

By way of example, an industrial control system contains many small applications that monitor and control the operational parameters of the system. Each of these applications is created by highly skilled programmer and written in specialized programming languages which may be unique to the parameter for which the application is responsible. The consequence is that updating existing applications in the system as well as adding new applications to the system is expensive, time-consuming, error-prone and constrained by the availability of programmers with the necessary skills. A number of advantages would result from realizing these applications as conversational programs. First, the applications could be created and updated by individuals who were thoroughly familiar with the physical characteristics of the system being controlled but who were not skilled in special-purpose programming languages. Second, applications could be updated in the field by local engineering and maintenance personnel and therefore accomplished in a timelier fashion. Third, as the applications could be created in a uniform manner using a common conversational programming language, the inter-working and cooperation of the applications would be easier to realize. Finally, the applications could be readily adapted to changing local conditions including but not limited to site-specific environmental conditions and operating procedures by the individuals charged with operating the system.

As another example, physical access control systems are characterized by complex and situation-specific policies and procedures. For example, who can open a door and under what circumstances they are permitted to do so may vary considerably from one door to another. The software implementing these systems as well as the data describing local policies and procedures reflect this complexity. What is more problematic is that representation of the rules installed in the physical access control system controlling doors may be quite different from the representation of the rules installed in the physical access control system controlling access to cabinets, for example, although the rules may be exactly the same; e.g. "Permit access by Sally Green during business hours." A number of advantages would result from realizing these applications as conversational programs. First, the access control rules in a device could be updated by security personnel in the field as required and immediately if necessary rather than by needing to contact personnel in a central location or in the information technology department. Second, there would be a common representation of rules across all physical control systems. Third, access control rules would be expressed in familiar spoken language constructs rather than as, for example, character representations of Boolean expressions in access control variables. The night watchman could simply say "Allow Sally Green to open the supply room between 10 and 11 this evening" rather than having to type something like OPEN IF IDENTITY=SALLY GREEN AND TIME>10 PM AND TIME<11 PM AND DATE=8 Nov. 2018. Additionally, a conversational programming system embedded in the device can also serve to identify people by their voiceprints not only to authenticate individuals wishing to update the system but also individuals wishing to gain physical access to what the device protects. In such a use case, the conversational programming system not only provides an easier, less error-prone, and more timely way of updating device software but, at the same time and with no additional cost, it may contribute a biometric factor to the authentication methods of the system.

As a further example, health care of the elderly population is more frequently being centered in the home and at the same time being automated to a greater extent. The home-based devices pertinent to an individual's home health care must necessarily be initially configured and continuously updated to reflect the individual's medical status as well as the home situation in general. In some cases, these tasks will fall to a home health aide who will have few technical skills and who will be faced with a wide and ever-growing proliferation of such devices across their home visitation locations. A number of advantages would result from realizing the applications in these devices as conversational programs. First, the applications can be readily and reliably updated by a home health aide. Speaking an update such as "Change the reminder to take amoxicillin from 8 in the morning to 10 at night" is easier than, for example, establishing a communication connection to a device from a mobile phone and typing the change in on the screen keypad of the phone. Having the device verbally repeat the change is a more reliable check on the change than displaying the change on a screen and the audible verification of the change may also serve as an additional reminder to the client if they were nearby. Second, being able to speak the names of things like drugs may be more efficient and less error-prone than forcing the home health aide to spell them. Third, there would be a common update method across all the home health care devices. Furthermore, the voice of the home health care aide could be used to authenticate the identity of the individual requesting the change.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure, possibly in combination with other embodiments of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PYTHON, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 5A:
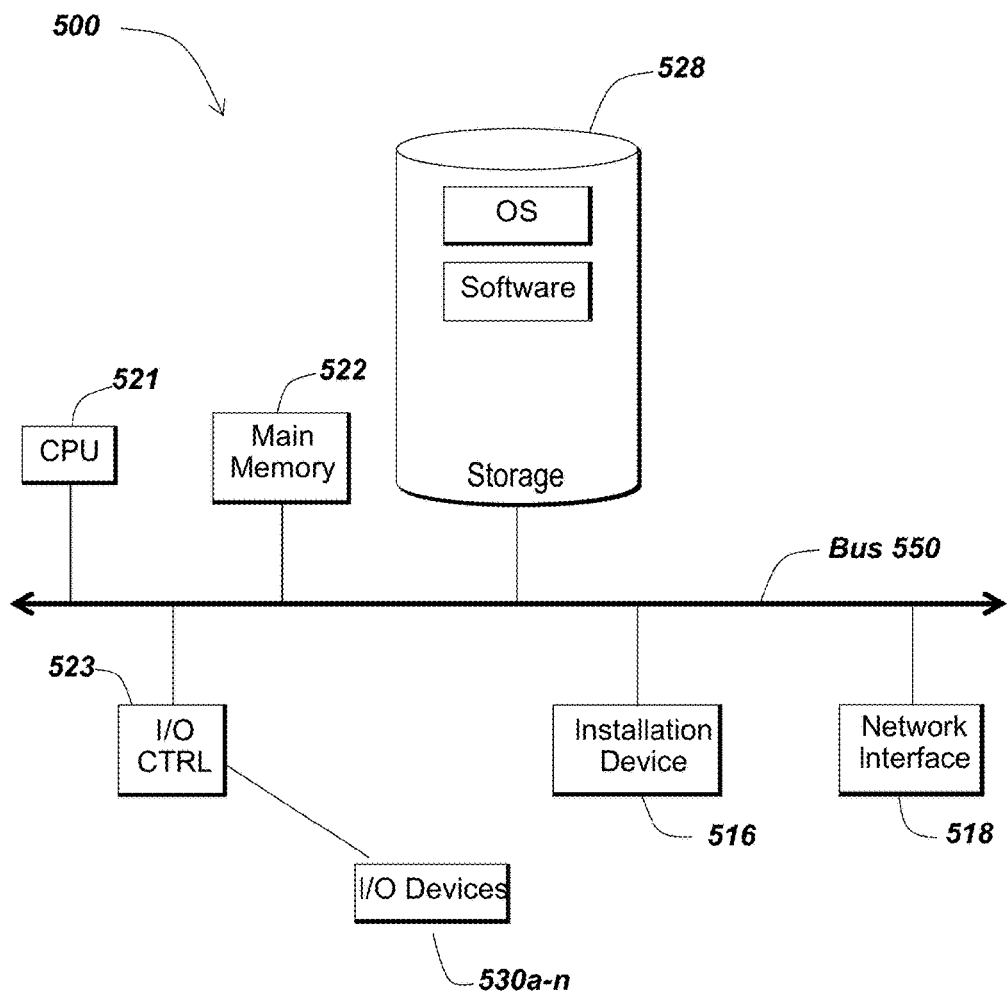
FIGS. 5A and 5B are block diagrams depicting embodiments of computers useful in connection with the methods and systems described herein.
Figure 5B:
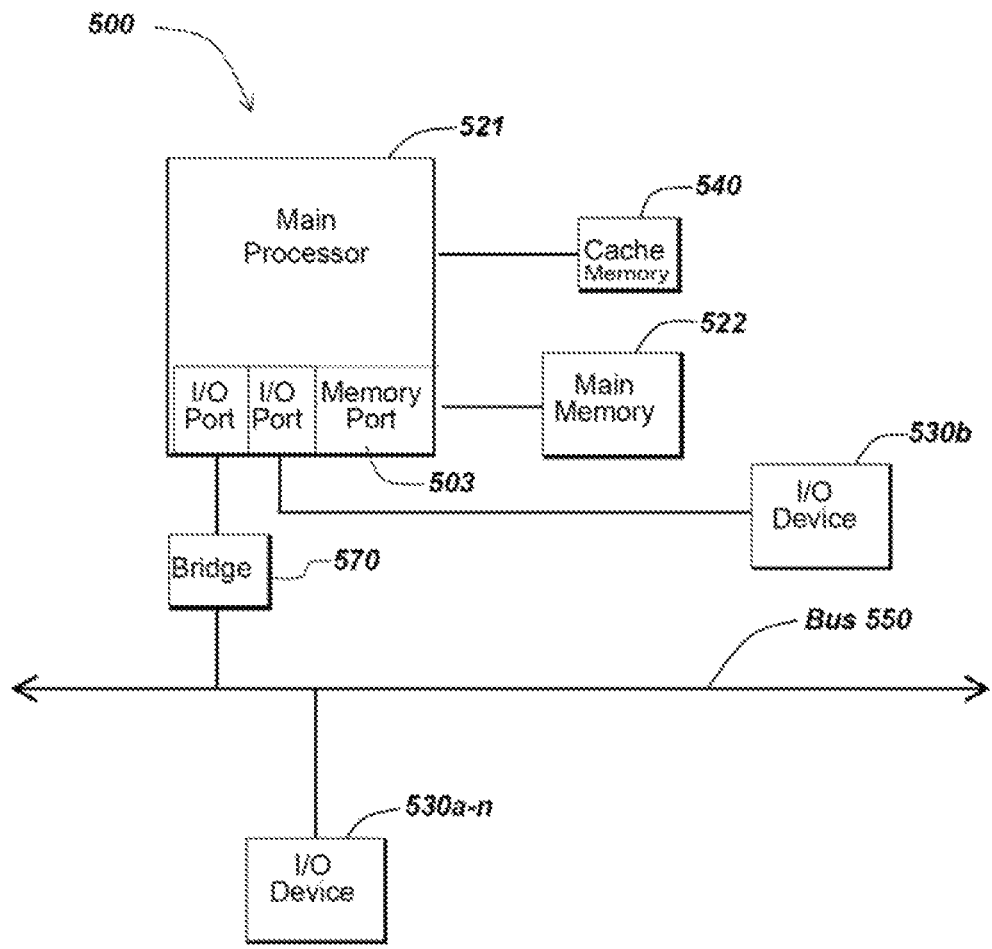

Referring now to FIGS. 5A and 5B, block diagrams depict additional detail regarding computing devices that may be modified to execution functionality for implementing the methods and systems described above.

FIGS. 5A and 5B depict block diagrams of a computing device 500 useful for modification to support the functionality of a voice-controlled device 105. As shown in FIGS. 5A and 5B, a computing device 500 includes a central processing unit 521, and a main memory unit 522. As shown in FIG. 5A, a computing device 500 may include a storage device 528, an installation device 516, a network interface 518. The storage device 528 may include, without limitation, an operating system and software. As shown in FIG. 5B, each computing device 500 may also include additional optional elements, such as a memory port 503, a bridge 570, one or more input/output devices 530a-n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 500 may be based on any of these processors, or any other processor capable of operating as described herein.

Main memory unit 522 may be one or more memory chips capable of storing data and allowing any storage location to be directly accessed by the microprocessor 521. The main memory 522 may be based on any available memory chips capable of operating as described herein. In the embodiment shown in FIG. 5A, the processor 521 communicates with main memory 522 via a system bus 550. FIG. 5B depicts an embodiment of a computing device 500 in which the processor communicates directly with main memory 522 via a memory port 503. FIG. 5B also depicts an embodiment in which the main processor 521 communicates directly with cache memory 540 via a secondary bus, sometimes referred to as a backside bus. In other embodiments, the main processor 521 communicates with cache memory 540 using the system bus 550.

In the embodiment shown in FIG. 5A, the processor 521 communicates with various I/O devices 530 via a local system bus 550. Various buses may be used to connect the central processing unit 521 to any of the I/O devices 530, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5B depicts an embodiment of a computing device 500 in which the main processor 521 also communicates directly with an I/O device 530b via, for example, HYPERTRANSPORT, RAPIDIO, or INFINIBAND communications technology.

One or more of a wide variety of I/O devices 530a-n may be present in or connected to the computing device 500, each of which may be of the same or different type and/or form. Input devices include microphones. Output devices include video speakers. The I/O devices may be controlled by an I/O controller 523 as shown in FIG. 5A. Furthermore, an I/O device may also provide storage and/or an installation device 516 for the computing device 500. In some embodiments, the computing device 500 may provide USB connections (not shown) to receive handheld USB storage devices such as the USB Flash Drive line of devices manufactured by Twintech Industry, Inc. of Los Alamitos, Calif.

Referring still to FIG. 5A, the computing device 500 may support any suitable installation device 516, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 500 may provide functionality for installing software over a network. The computing device 500 may further comprise a storage device, such as one or more hard disk drives or redundant arrays of independent disks, for storing an operating system and other software. Alternatively, the computing device 500 may rely on memory chips for storage instead of hard disks.

Furthermore, the computing device 500 may include a network interface 518 to interface to a computer network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may comprise a built-in network adapter, network interface card, PCMCIA network card, card bus network adapter, wireless network adapter, USB network adapter, modem, or any other device suitable for interfacing the computing device 500 to any type of network capable of communication and performing the operations described herein.

A computing device 500 of the sort depicted in FIGS. 5A and 5B typically operates under the control of operating systems, which control scheduling of tasks and access to system resources. The computing device 500 can be running any operating system including those conventionally used for desktop machines (e.g., such as any of the versions of the MICROSOFT WINDOWS operating systems or any version of the MAC OS for Macintosh computers), those used for mobile devices (e.g., such as the AMAZON FIRE OS, an ANDROID-based mobile operating system), any embedded operating system, any open source operating system, any proprietary operating system, or any other operating system capable of running on the computing device and performing the operations described herein.

In some embodiments, the computing device 500 comprises a combination of devices, such as a smart speaker combined with a digital audio player. In one of these embodiments, the computing device 500 is a device executing the ANDROID open source mobile phone platform distributed by the Open Handset Alliance.

Having described certain embodiments of methods and systems for voice-based programming of a voice-controlled device, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for voice-based programming of a voice-controlled device and execution of voice-based programs, the method comprising:

executing, by a voice-controlled device, an application for recognizing spoken programming commands, the application including a plurality of keyword phrases each associated with at least one action;

receiving, by a voice-controlled device, an audio signal representing a first user utterance;

identifying, by the voice-controlled device, within the received audio signal, one of the plurality of keyword phrases and data for use in taking the action associated with the one of the plurality of keyword phrases, the one of the plurality of keyword phrases including an identification of an audio input triggering an action;

modifying, by the voice-controlled device, at least one data structure stored by the voice-controlled device responsive to the identified one of the plurality of keyword phrases and data;

detecting, by the voice-controlled device, a second user utterance including the identified audio input triggering the action; and executing the action using the identified data.

2. The method of claim 1, wherein the identification of the audio input triggering an action includes a command to create a data structure and a command to store the created data structure in a memory store of the voice-controlled device.

3. The method of claim 1, wherein the identification of the audio input triggering an action includes a command to begin monitoring subsequent user utterances for the identified audio input triggering the action.

4. The method of claim 1, wherein the stored data is the data identified within the audio signal as the data for use in taking the action.

* * * * *

UNITED STATES PATENT AND TRADEMARK OFFICE
CERTIFICATE OF CORRECTION

PATENT NO. : 10,311,874 B2  
APPLICATION NO. : 16/053264  
DATED : June 4, 2019  
INVENTOR(S) : Scott B. Guthery Page 1 of 1

It is certified that error appears in the above-identified patent and that said Letters Patent is hereby corrected as shown below:

In the Specification

In Column 4, Line 1, delete "how take" and insert -- how to take --, therefor.

In Column 6, Line 13, delete "[user-defined" and insert -- '[user-defined --, therefor.

In Column 7, Line 28, delete "ioGen," and insert -- 10Gen, --, therefor.

In Column 15, Line 8, delete "Ifs is" and insert -- If s is --, therefor.

In Column 15, Line 16, delete "D(s, t)=|3.4=8.2|+|5.6-4.7|+" and insert -- D(s, t)=|3.4-8.2|+|5.6-4.7|+ --, therefor.

Signed and Sealed this  
Sixteenth Day of July, 2019

Andrei Iancu  
*Director of the United States Patent and Trademark Office*